United States Patent
Roy et al.

(10) Patent No.: US 11,276,154 B2
(45) Date of Patent: Mar. 15, 2022

(54) MULTI-FRAME DEPTH-BASED MULTI-CAMERA RELIGHTING OF IMAGES

(71) Applicant: Samsung Electronics Co., Ltd., Suwon-si (KR)

(72) Inventors: Deboleena Roy, West Lafayette, IN (US); Long N. Le, Richardson, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 16/947,106

(22) Filed: Jul. 17, 2020

(65) Prior Publication Data

US 2022/0020128 A1 Jan. 20, 2022

(51) Int. Cl.
*G06T 5/00* (2006.01)
*G06T 5/50* (2006.01)
(Continued)

(52) U.S. Cl.
CPC ............... *G06T 5/50* (2013.01); *G06T 5/002* (2013.01); *G06T 5/007* (2013.01); *G06T 7/55* (2017.01);
(Continued)

(58) Field of Classification Search
CPC ........... G06T 5/50; G06T 5/002; G06T 5/007; G06T 5/003; G06T 5/008; G06T 5/009;
(Continued)

(56) References Cited

U.S. PATENT DOCUMENTS

| 2012/0176481 | A1* | 7/2012 | Lukk | H04N 13/243 348/47 |
| 2012/0321171 | A1* | 12/2012 | Ito | H04N 13/239 382/154 |

(Continued)

FOREIGN PATENT DOCUMENTS

KR 10-2014-0135416 A 11/2014

OTHER PUBLICATIONS

International Search Report and Written Opinion of the International Searching Authority in connection with International Patent Application No. PCT/KR2020/015395 dated Apr. 19, 2021, 6 pages.

(Continued)

*Primary Examiner* — Jose L Couso

(57) ABSTRACT

A method includes capturing a plurality of first images using a first image sensor and a plurality of second images using a second image sensor. The method also includes generating a short single view, short depth map, long single view, and long depth map from the first and second images. The method further includes generating a multi-frame depth map using the short single view, short depth map, long single view, and long depth map. The method also includes generating a gain map using the multi-frame depth map and lighting conditions, where the lighting conditions introduce a relighting effect into the gain map. The method further includes generating a relit short single view and a relit long single view by applying the gain map to the short and long single views. In addition, the method includes generating a relit image by fusing the relit short and long single views.

20 Claims, 14 Drawing Sheets

(51) Int. Cl.
*G06T 7/55* (2017.01)
*H04N 5/243* (2006.01)

(52) U.S. Cl.
CPC ... *H04N 5/243* (2013.01); *G06T 2207/20221* (2013.01)

(58) Field of Classification Search
CPC .. G06T 7/55; G06T 7/586; G06T 7/85; G06T 7/557; G06T 7/80; G06T 7/50; G06T 7/70; G06T 7/285; G06T 7/593; G06T 7/596; G06T 3/4038; G06T 3/4053; G06T 2207/20221; G06T 2207/30252; G06T 2207/10024; G06T 2207/10052; G06T 2207/10021; G06T 2207/10012; G06T 2207/20104; G06T 2207/10144; G06T 2207/20081; G06T 2207/30244; G06T 2207/10016; G06T 2207/10028; H04N 5/243; H04N 5/2256; H04N 5/247; H04N 5/23238; H04N 5/2354; H04N 5/23232; H04N 5/2226; H04N 5/357; H04N 5/3415; H04N 5/2621; H04N 5/23296; H04N 5/35545; H04N 13/271; H04N 13/128; H04N 13/282; H04N 13/239; H04N 13/246; H04N 13/254; H04N 13/167; H04N 13/243; H04N 2012/0081; H04N 2012/0085; H04N 2213/003; G06K 9/00221; G06K 9/00255; G06K 9/4661; G06K 9/4671; G06K 9/6212; G06K 9/20; G06K 2209/40; G06K 2209/401; G01S 17/89; G01S 17/894; A63F 2300/8082; G06F 3/011; G06F 3/012; G06F 3/04815

See application file for complete search history.

(56) References Cited

U.S. PATENT DOCUMENTS

| | | |
|---|---|---|
| 2015/0312553 A1 | 10/2015 | Ng et al. |
| 2017/0094253 A1 | 3/2017 | Matthews et al. |
| 2017/0105020 A1* | 4/2017 | Wajs .................... H04N 5/2226 |
| 2018/0275278 A1 | 9/2018 | Yamada |
| 2018/0295341 A1 | 10/2018 | Lee |
| 2019/0094981 A1* | 3/2019 | Bradski .............. G02B 27/0093 |
| 2020/0186781 A1* | 6/2020 | Jannard ................ H04N 13/243 |

OTHER PUBLICATIONS

Fang et al., "Creatism: A deep-learning photographer capable of creating professional work," 1707.03491v1, Jul. 2017, 14 pages.

Sun et al., "Single Image Portrait Relighting," 1905.00824v1, May 2019, 12 pages.

"Apollo" (App on iPhone), Apollo: Immersive Illumination, 5 pages.

* cited by examiner

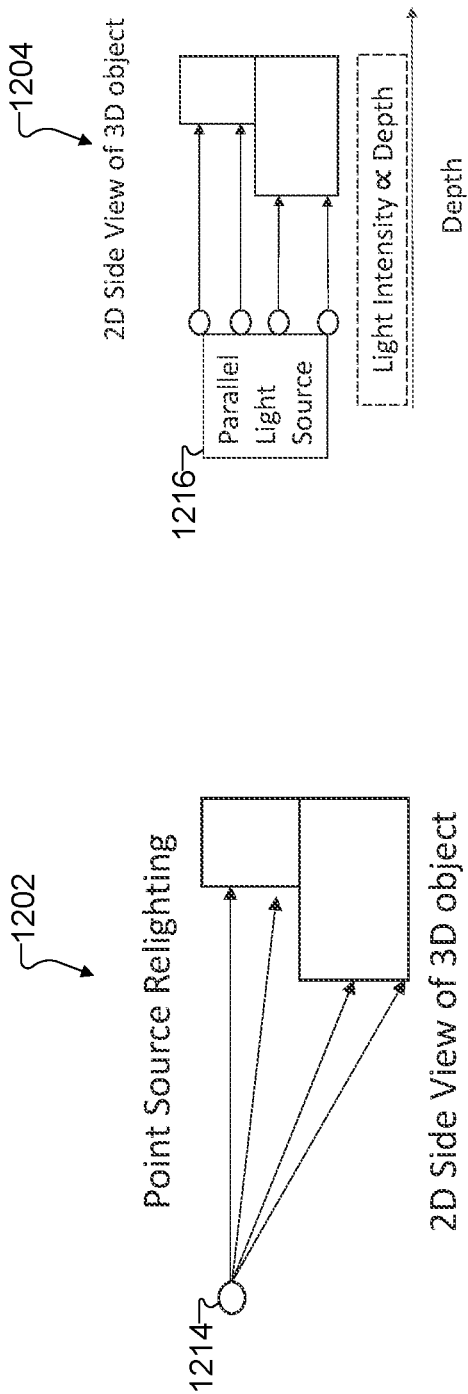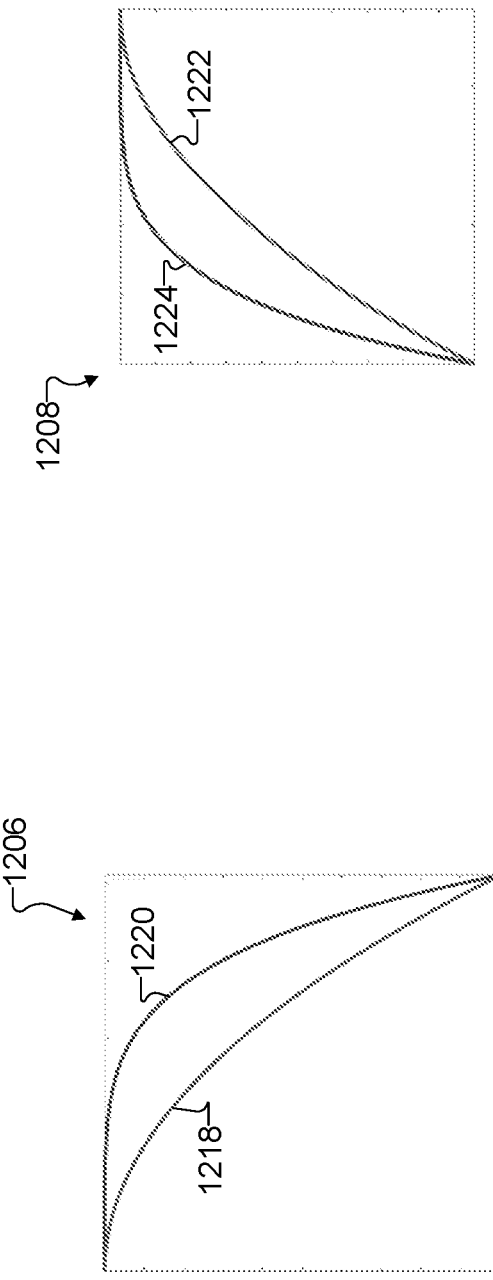
FIG. 12A
FIG. 12B
FIG. 12C
FIG. 12D

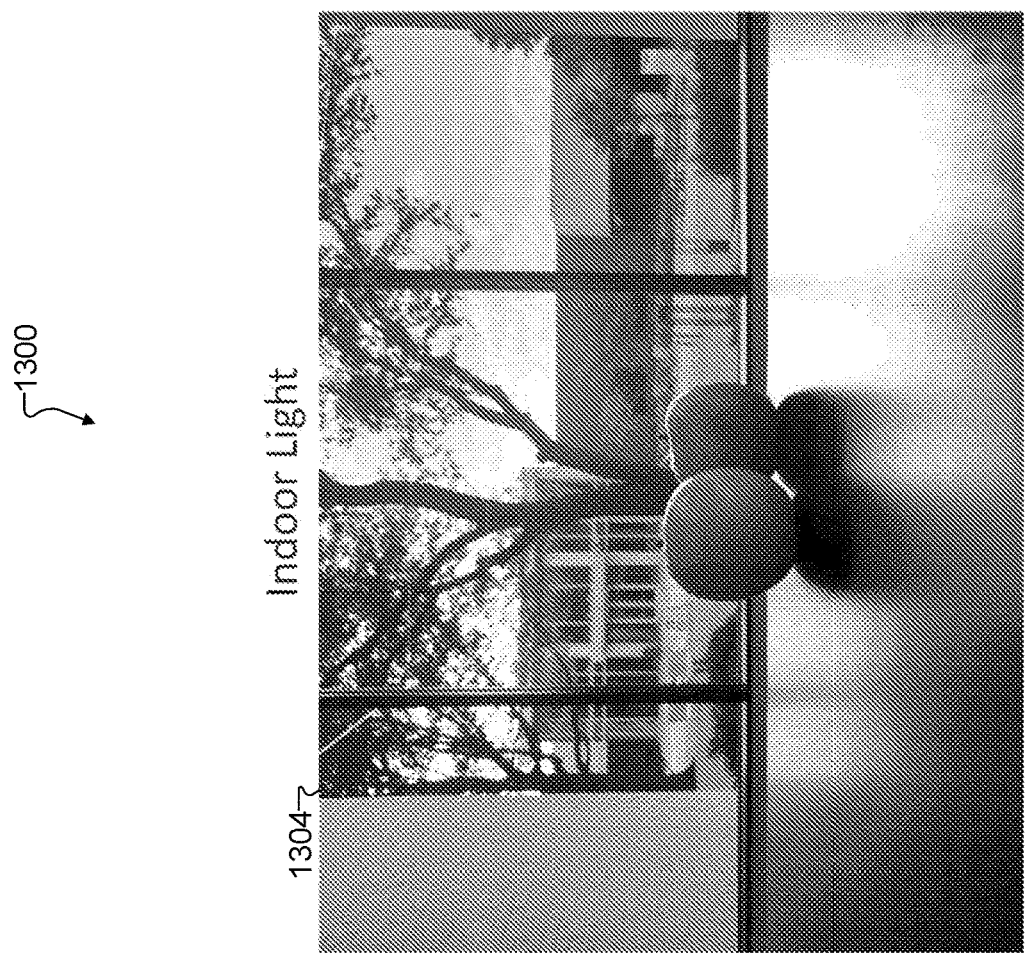
FIG. 13A
FIG. 13B

1

MULTI-FRAME DEPTH-BASED MULTI-CAMERA RELIGHTING OF IMAGES

TECHNICAL FIELD

This disclosure relates generally to image capturing systems. More specifically, this disclosure relates to multi-frame depth-based multi-camera relighting of images.

BACKGROUND

Lighting within an image is often a key factor affecting the image's aesthetic quality. The ability to relight an image, meaning to change the lighting within the image, after image capture is a powerful tool. Among other things, this allows consumers to tap into their inner artists and create desired effects. However, most image editing tools operate on a single processed image file, such as a Joint Photographic Experts Group (JPEG) file. Unfortunately, a large amount of original image data, such as color and luminance data, is lost when relighting tools operate on processed image files.

SUMMARY

This disclosure relates to multi-frame depth-based multi-camera relighting of images.

In a first embodiment, a method includes capturing a plurality of first images using a first image sensor and a plurality of second images using a second image sensor. The method also includes generating a short single view, a short depth map, a long single view, and a long depth map from the plurality of first images and the plurality of second images. The method further includes generating a multi-frame depth map using the short single view, the short depth map, the long single view, and the long depth map. The method also includes generating a gain map using the multi-frame depth map and lighting conditions, where the lighting conditions introduce a relighting effect into the gain map. The method further includes generating a relit short single view and a relit long single view by applying the gain map to the short single view and the long single view. In addition, the method includes generating a relit image by fusing the relit short single view and the relit long single view.

In a second embodiment, an electronic device includes a first image sensor configured to capture a plurality of first images, a second image sensor configured to capture a plurality of second images, and at least one processing device operatively coupled to the first image sensor and the second image sensor. The at least one processing device is configured to generate a short single view, a short depth map, a long single view, and a long depth map from the plurality of first images and the plurality of second images. The at least one processing device is also configured to generate a multi-frame depth map using the short single view, the short depth map, the long single view, and the long depth map. The at least one processing device is further configured to generate a gain map using the multi-frame depth map and lighting conditions, where the lighting conditions introduce a relighting effect into the gain map. The at least one processing device is also configured to apply the gain map to the short single view and the long single view in order to generate a relit short single view and a relit long single view. In addition, the at least one processing device is configured to fuse the relit short single view and the relit long single view in order to generate a relit image.

In a third embodiment, a non-transitory machine-readable medium contains instructions that when executed cause at least one processor of an electronic device to capture a plurality of first images using a first image sensor and a plurality of second images using a second image sensor. The medium also contains instructions that when executed cause the at least one processor to generate a short single view, a short depth map, a long single view, and a long depth map from the plurality of first images and the plurality of second images. The medium further contains instructions that when executed cause the at least one processor to generate a multi-frame depth map using the short single view, the short depth map, the long single view, and the long depth map. The medium also contains instructions that when executed cause the at least one processor to generate a gain map using the multi-frame depth map and lighting conditions, where the lighting conditions introduce a relighting effect into the gain map. The medium further contains instructions that when executed cause the at least one processor to apply the gain map to the short single view and the long single view in order to generate a relit short single view and a relit long single view. In addition, the medium contains instructions that when executed cause the at least one processor to fuse the relit short single view and the relit long single view in order to generate a relit image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member,"

"apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 12A, 12B, 12C, and 12D illustrate specific example techniques for gain map generation in accordance with this disclosure;

FIGS. 13A and 13B illustrate example results of relighting operations in accordance with this disclosure.

DETAILED DESCRIPTION

FIGS. 1 through 14, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, lighting within an image is often a key factor affecting the image's aesthetic quality. The ability to relight an image, meaning to change the lighting within the image, after image capture is a powerful tool. Among other things, this allows consumers to tap into their inner artists and create desired effects. However, most image editing tools operate on a single processed image file, such as a Joint Photographic Experts Group (JPEG) file. Unfortunately, a large amount of original image data, such as color and luminance data, is lost when relighting tools operate on processed image files.

This disclosure provides various techniques for image relighting in a multi-frame imaging system before image fusion occurs. As described in more detail below, a series of images can be captured at different exposure levels, and each image can be relit differently depending on its exposure level. Also, a depth map can be utilized to create relit "gain" maps that are applied to the images. The relit images can then be combined together to form a final image of a scene, ideally with more aesthetic-pleasing relighting effects.

Figure 1:
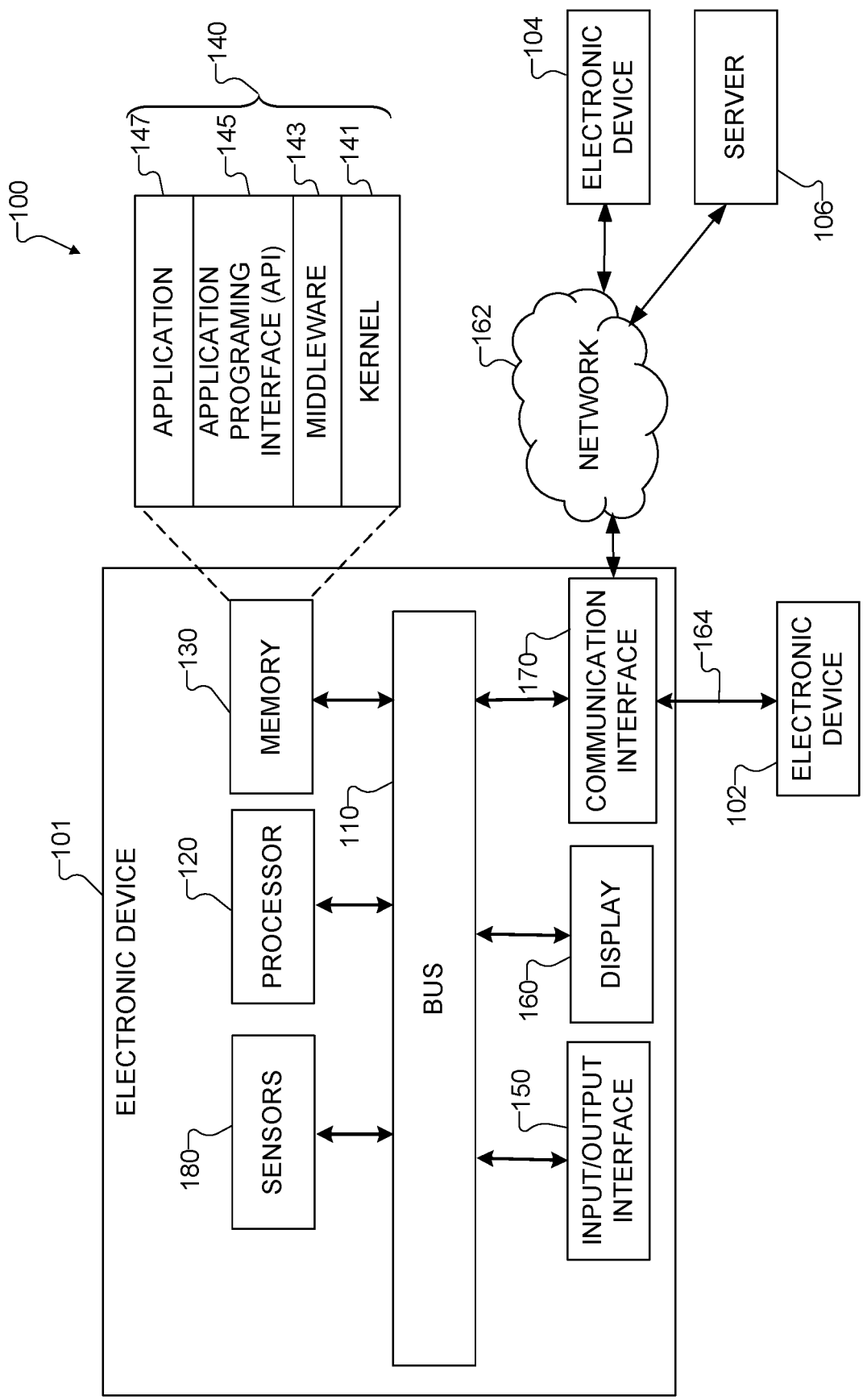
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 can receive image data captured by multiple cameras or other image sensors and process the image data to produce images of scenes, and the processor 120 can perform multi-frame depth-based relighting of images.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include multiple cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 processes image data to perform multi-frame depth-based multi-camera relighting of images.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2B:
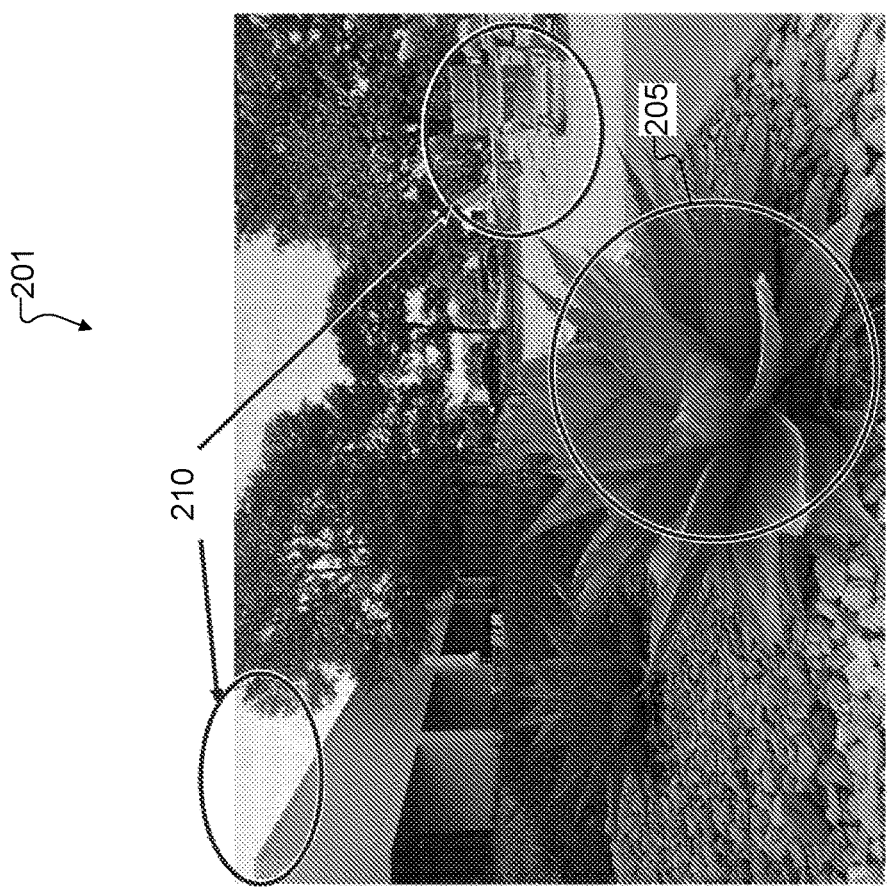
FIGS. 2A and 2B illustrate example multi-frame images in accordance with this disclosure.
Figure 2A:
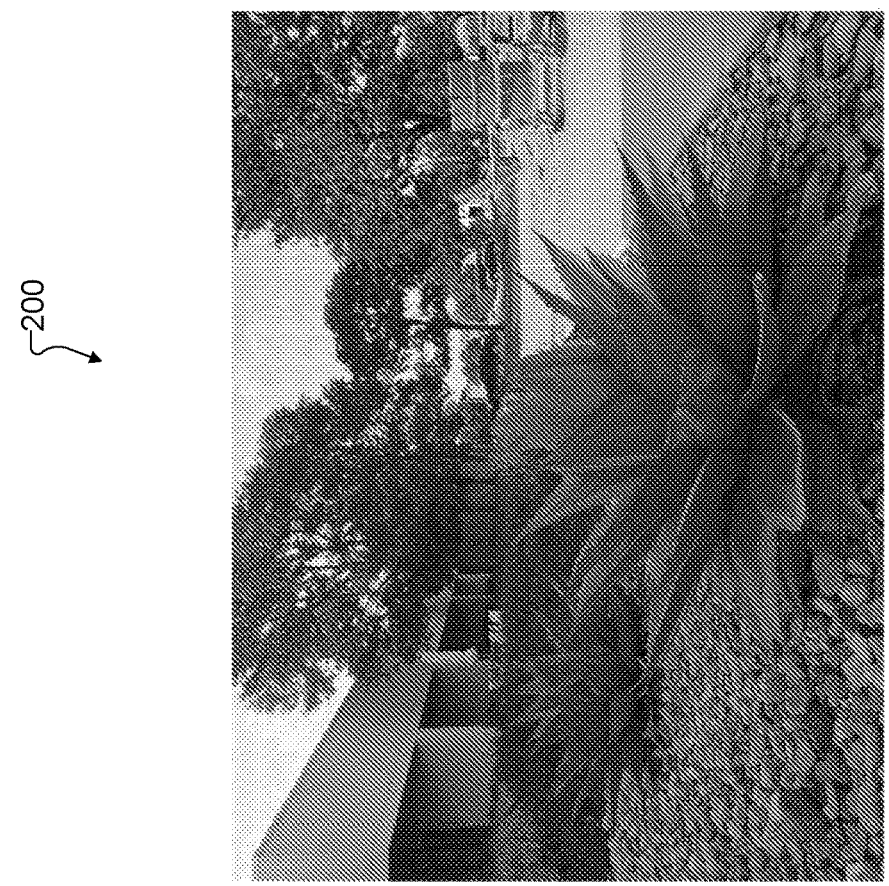

FIGS. 2A and 2B illustrate example multi-frame images 200-201 in accordance with this disclosure. In particular, FIG. 2A illustrates an example multi-frame image 200 with no relighting, and FIG. 2B illustrates an example multi-frame relit image 201. Here, a "multi-frame" image refers to an image that is produced by fusing or otherwise combining multiple input images or image frames. For ease of explanation, the images 200 and 201 may be described as being captured using the electronic device 101 of FIG. 1. However, the images 200 and 201 may be captured with any suitable electronic device and in any suitable system.

In this example, the multi-frame image 200 represents an image captured with a standard exposure time. This particular image 200 is an image of a scene outside an office building. The scene has plants in a rock garden next to a sidewalk. The sidewalk extends from the foreground to the background of the image 200, and a shadow falls across the sidewalk in the foreground of the image.

For a short exposure time, dark portions 205 of the scene may experience significant loss of detail due to under-exposure. As exposure time increases, the amount of light that is captured by an image sensor increases, allowing for more detail in the dark portions 205 of the scene. For a long exposure time, light portions 210 of the scene may experience significant loss of detail due to over-exposure. As exposure time decreases, the amount of light that is captured by the image sensor decreases, allowing for more detail in the light portions 210 of the scene. Averaging the exposure time could cause small details to be lost in both bright and dark areas of the scene.

Some approaches for relighting can include adjustments to specific colors for enhancing photographic effects. For example, relighting could focus the foreground of a scene to transition from a blue shade on the left side to a red shade on the right side. However, this effect could cause the plant in the front of the images 200-201 to have a shade of purple, and the rocks in the foreground of the images 200-201 would have a shade of blue on the left side and a shade of red on the right side.

Although FIGS. 2A and 2B illustrate examples of multi-frame images 200-201, various changes may be made to FIGS. 2A and 2B. For example, images can be captured of any number of scenes, and the images 200-201 in FIGS. 2A and 2B are merely examples of images that might be captured.

Figure 3A:
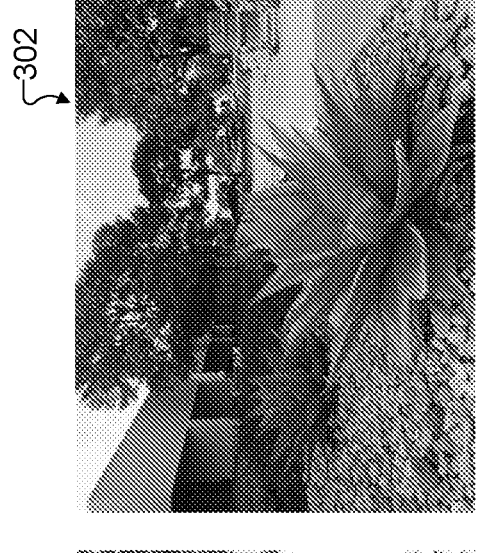
FIGS. 3A, 3B, and 3C illustrate example relit images in accordance with this disclosure.
Figure 3B:
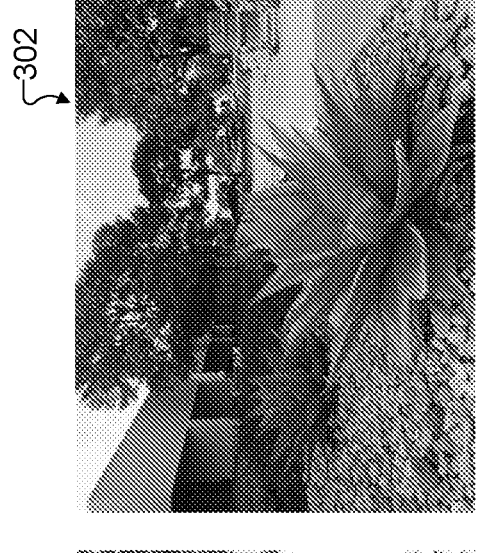
Figure 3C:

FIGS. 3A, 3B, and 3C illustrate example relit images 300-302 in accordance with this disclosure. In particular, FIG. 3A illustrates an example no-depth relit image 300, FIG. 3B illustrates an example depth-aware single-frame relit image 301, and FIG. 3C illustrates an example depth-aware multi-frame relit image 302. For ease of explanation, the images 300-302 may be described as being captured using the electronic device 101 of FIG. 1. However, the images 300-302 may be captured with any suitable electronic device and in any suitable system.

The images 300-302 here capture the same scene as the images 200-201. The no-depth relit image 300 represents an image with no notion of depth, which means that additional lighting is added throughout the image 300. With this indiscriminate lighting, details can be lost in brighter areas of the scene. For example, in the image 300, details around the top of the building at the top left of the image 300 are lost, where the roofline is almost non-visible. Similar details are lost with respect to chairs on the right side of the image 300, where at least one chair is almost non-visible due to the increased lighting in the image 300.

The depth-aware single-frame relit image 301 has depth considered in the relighting, but only to the extent that additional light is provided to the foreground of the image 301. Considering depth in a scene when performing relighting operations allows for details in the background to be retained relative to the no-depth relit image 300. Thus, for example, the roofline of the building at the top right of the image 301 is now visible, as are the chairs at the right side of the image 301. However, the relighting in the foreground still can have issues with lost details, such as in bright areas of the scene. For instance, the sidewalk is overly brightened in a manner such that the shaded part of the sidewalk at the foreground of the image is not visible.

The depth-aware multi-frame relit image 302 uses depths within the scene, along with multiple image frames captured using different exposure times. In this example, the addition of light is only added to the foreground while keeping the overall well-exposedness of the scene. This approach allows for bright areas of the foreground to avoid saturation. In this particular example, this allows the shadow across the sidewalk in the foreground to remain visible. The following describes various techniques for performing multi-frame depth-based multi-camera relighting of images.

Although FIGS. 3A, 3B, and 3C illustrate examples of relit images 300-302, various changes may be made to FIGS. 3A, 3B, and 3C. For example, images can be captured of any number of scenes, and the images 300-302 in FIGS. 3A, 3B, and 3C are merely examples of images that might captured.

Figure 4:
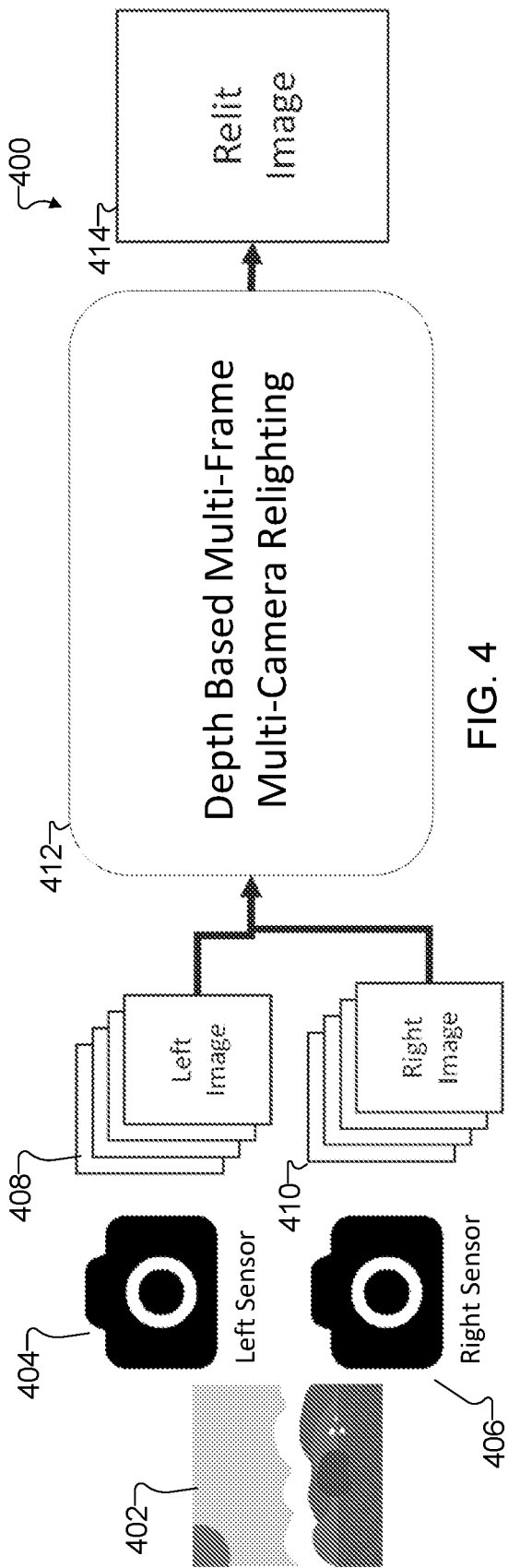
FIG. 4 illustrates an example approach for multi-frame depth-based multi-camera relighting of images in accordance with this disclosure.

FIG. 4 illustrates an example approach 400 for multi-frame depth-based multi-camera relighting of images in accordance with this disclosure. For ease of explanation, the approach 400 illustrated in FIG. 4 may be described as being used by the electronic device 101 of FIG. 1. However, the approach 400 may be used with any suitable electronic device and in any suitable system.

As shown in FIG. 4, the electronic device 101 or other device captures images of a scene 402 using multiple cameras or other image sensors. For simplicity of discussion, the electronic device 101 is assumed to include a first image sensor 404 and a second image sensor 406. In the following discussion, it is assumed that the image sensors 404 and 406 are side-by-side, with the image sensor 404 positioned on the left and the image sensor 406 positioned on the right. However, the image sensors 404 and 406 can have any suitable arrangement on the electronic device 101, such as side-by-side, above and below, or offset. Also, the electronic device 101 may include any suitable number of image sensors in any suitable arrangement.

The first image sensor 404 captures a plurality of first images 408 of the scene 402, and the second image sensor 406 captures a plurality of second images 410 of the scene 402. Depending on the implementation, the first images 408 and the second images 410 can be captured at different exposure times or at similar exposure times, typically in rapid succession. In some embodiments, the exposure times can vary or alternate with the first image sensor 404 and the second image sensor 406. Also, the sequence of image capture can be consistent between the first image sensor 404 and the second image sensor 406, meaning the image sensors 404 and 406 may capture the same number of images using the same sequence of exposure time(s).

The first images 408 and the second images 410 are processed using a depth-based multi-frame multi-camera relighting operation 412. The depth-based multi-frame multi-camera relighting operation 412 generally operates to process the images 408 and 410 in order to generate at least one relit image 414, which represents an image of the scene 402 generated by applying a relighting operation to at least some of the images 408 and 410 and by combining at least some of the images 408 and 410. The multi-frame depth consideration provides an improved depth map that is robust to poor exposure conditions. The multi-frame relighting also provides for pre-fusion relighting of images (meaning the relighting occurs before the images 408 and 410 are combined), which results in well-exposed relit images 414. One example implementation of the depth-based multi-frame multi-camera relighting operation 412 is described below, and examples of relit images 414 that can be generated using the depth-based multi-frame multi-camera relighting operation 412 are described below.

Although FIG. 4 illustrates one example of an approach 400 for multi-frame depth-based multi-camera relighting of images, various changes may be made to FIG. 4. For example, the approach 400 may involve the use of more than two image sensors.

Figure 5:
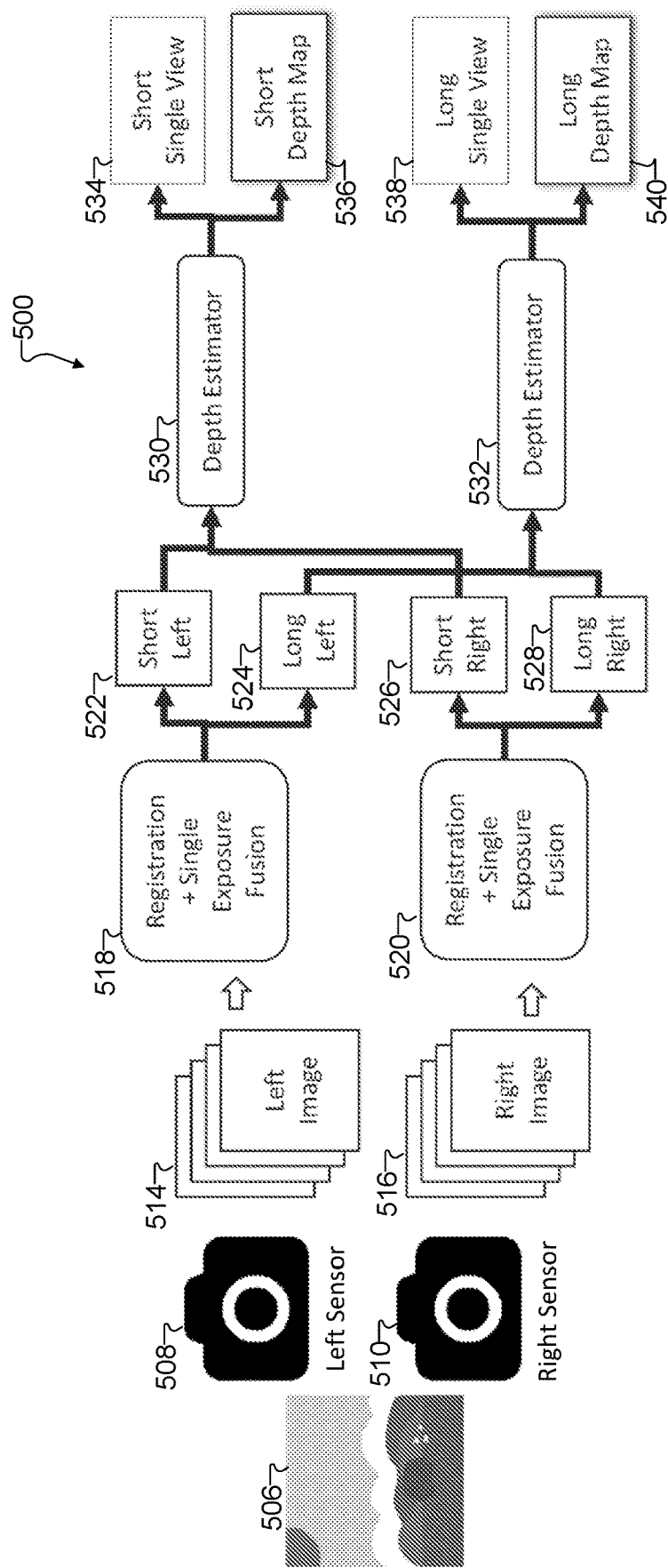
FIG. 5 illustrates an example approach for multi-exposure depth generation for relighting of images in accordance with this disclosure.

FIG. 5 illustrates an example approach 500 for multi-exposure depth generation for relighting of images in accordance with this disclosure. For ease of explanation, the approach 500 illustrated in FIG. 5 may be described as being used by the electronic device 101 of FIG. 1. However, the approach 500 may be used with any suitable electronic device and in any suitable system.

As shown in FIG. 5, the electronic device 101 or other device captures images of a scene 506 using multiple cameras or other image sensors. For simplicity of discussion, the electronic device 101 is assumed to include a first image sensor 508 and a second image sensor 510. In the following discussion, it is assumed that the image sensors 508 and 510 are side-by-side, with the image sensor 508 positioned on the left and the image sensor 510 positioned on the right. However, the image sensors 508 and 510 can have any suitable arrangement on the electronic device 101, such as side-by-side, above and below, or offset. Also, the electronic device 101 may include any suitable number of image sensors in any suitable arrangement. The first image sensor 508 captures a plurality of first images 514 of the scene 506, and the second image sensor 510 captures a plurality of second images 516 of the scene 506. Note here that these elements may be the same as or similar to corresponding elements shown in FIG. 4 and described above.

The images 514 are processed using a first registration and single exposure fusion operation 518, and the images 516 are processed using a second registration and single exposure fusion operation 520. Note that the first and second registration and single exposure fusion operations 518 and 520 may actually represent the same registration and single exposure fusion operation that is simply reused with the different sets of images 514 and 516. Because multiple images 514 or 516 are captured over time, it is possible for the images 514 or 516 to be misaligned, such as due to motion of the electronic device (which is common for handheld devices). Each registration and single exposure fusion operation 518 and 520 operates to align the images 514 or 516 in order to produce aligned versions of the images 514 or 516. Moreover, after alignment, each registration and single exposure fusion operation 518 and 520 operates to fuse or combine the aligned versions of the images 514 or 516 that were captured using common exposure values. For example, the first registration and single exposure fusion operation 518 can fuse images 514 captured using a shorter exposure to produce a short exposure first frame 522 and can fuse images 514 captured using a longer exposure to produce a long exposure first frame 524. The second registration and single exposure fusion operation 520 can similarly fuse images 516 captured using a shorter exposure to produce a short exposure second frame 526 and can fuse images 516 captured using a longer exposure to produce a long exposure second frame 528. Note that "short" and "long" are used in this patent document to refer to relative exposures, meaning a "short" exposure involves an exposure level that is shorter compared to a "long" exposure. These terms do not impart any specific numerical values to the exposure levels.

A first depth estimator 530 receives the frames 522 and 526, and a second depth estimator 532 receives the frames 524 and 528. Note that the first and second depth estimators 530 and 532 may actually represent the same depth estimator that is simply reused with the different sets of frames 522 and 526 or 524 and 528. Each depth estimator 530 and 532 operates to calculate a depth map of the scene 506 using the same exposure views from the image sensors 508 and 510. For example, each depth estimator 530 and 532 can determine a depth of each pixel from its input fused images to create a depth map based on the determined depths. Each depth estimator 530 and 532 also operates to produce a fused image and an associated depth map for the fused image. For example, the first depth estimator 530 can generate and output a short single view 534 and a short depth map 536 from the short exposure first frame 522 and the short exposure second frame 526. The short single view 534 is a unified image from the short exposure first frame 522 and the short exposure second frame 526 that corresponds to the short depth map 536. Similarly, the second depth estimator 532 can generate and output a long single view 538 and a long depth map 540 from the long exposure first frame 524 and the long exposure second frame 528. The long single view 538 is a unified image from the long exposure first frame 524 and the long exposure second frame 528 that corresponds to the long depth map 540.

Although FIG. 5 illustrates one example of an approach 500 for multi-exposure depth generation for relighting of images, various changes may be made to FIG. 5. For example, the approach 500 may involve the use of more than two image sensors. Also, the approach 500 may involve the use of more than two registration and single exposure fusion operations and more than two depth estimators.

Figure 6:
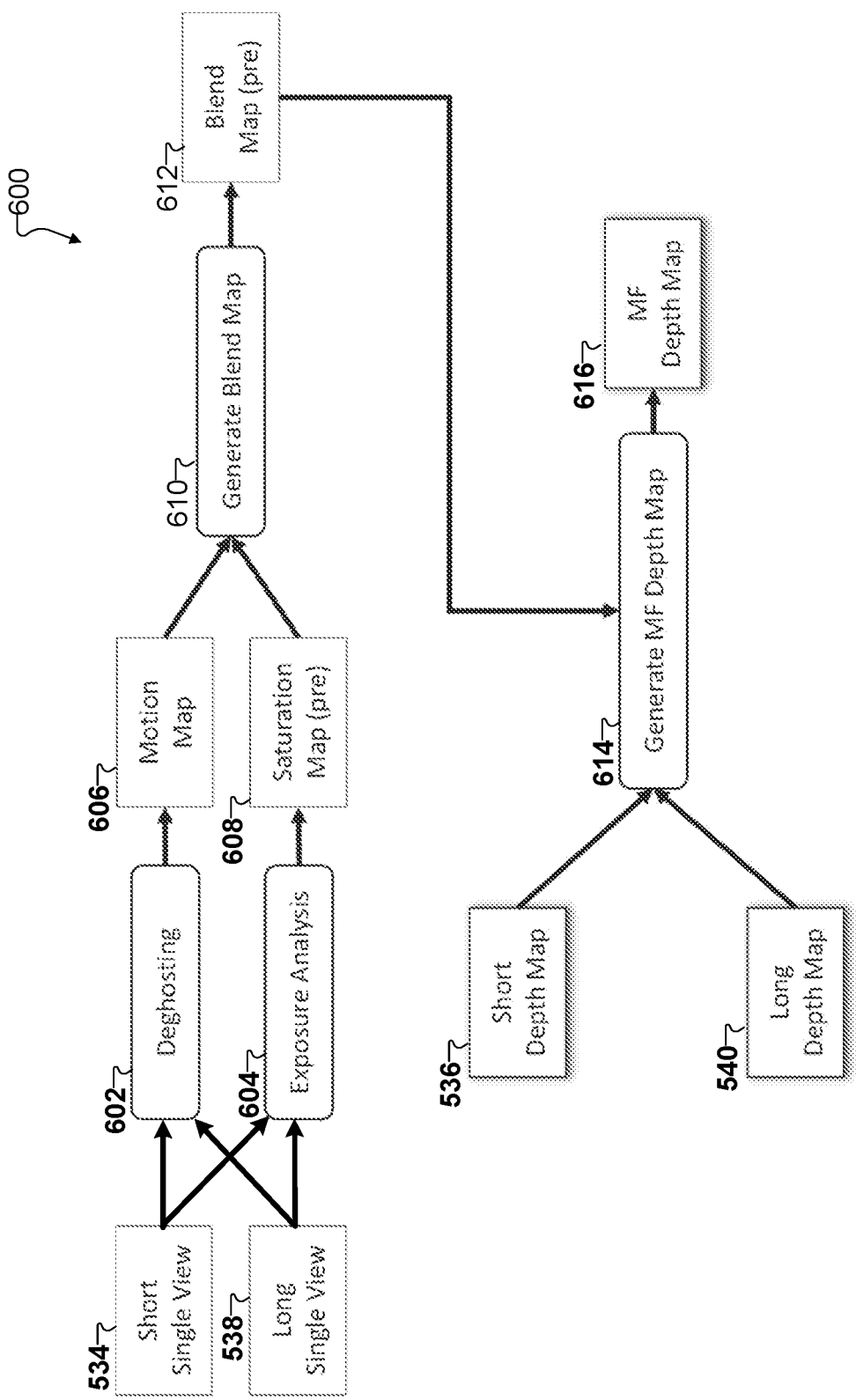
FIG. 6 illustrates an example approach for multi-frame depth fusion for relighting of images in accordance with this disclosure.

FIG. 6 illustrates an example approach 600 for multi-frame depth fusion for relighting of images in accordance with this disclosure. For ease of explanation, the approach 600 illustrated in FIG. 6 may be described as being used by the electronic device 101 of FIG. 1. However, the approach 600 may be used with any suitable electronic device and in any suitable system.

The approach 600 shown in FIG. 6 continues the process shown in FIG. 5, namely by receiving and processing the short single view 534, the long single view 538, the short depth map 536, and the long depth map 540. As shown in FIG. 6, the short single view 534 and the long single view 538 are provided to a deghosting operation 602 and an exposure analysis 604. The deghosting operation 602 operates to identify motion regions among the input images 534 and 538 so that blending in those regions can be suppressed. This is useful since blending in motion regions of images can lead to the creation of ghosting artifacts. The deghosting operation 602 can be performed in any suitable manner.

In some embodiments of the deghosting operation 602, one view 534 or 538 is selected as a reference image frame, and the other view 538 or 534 is designated as a non-reference image frame. For same-exposure images (such as all long images or all short images), any image can be chosen as the reference image frame without loss of generality. The output of the deghosting operation 602 is a motion map 606, which (in some embodiments) can have values in the range [0, 1]. For example, a value of "0" may indicate motion, and a value of "1" may indicate no motion. Details of an example implementation of the deghosting operation 602 can be found below in relation to FIGS. 7A-7D.

The exposure analysis 604 operates to generate a saturation map 608 using the short single view 534 and the long single view 538. The saturation map 608 indicates which portions of the short single view 534 and the long single view 538 are overly-saturated or too bright. The output of the exposure analysis 604 is a saturation map 608, which (in some embodiments) can have values in the range [0, 1]. For example, a value of "1" may indicate saturation, and a value of "0" may indicate no saturation. Various techniques may be used to perform the exposure analysis 604. Details of an example implementation of the exposure analysis 604 can be found below in relation to FIG. 8.

A blend map generation operation 610 receives the motion map 606 and the saturation map 608. The blend map generation operation 610 uses the motion map 606 and the saturation map 608 to generate a blend map 612. The blend map 612 represents an initial estimate of which portions of the input images 534 and 538 can be fused or blended and which portions of the input images 534 and 538 cannot be fused. Note that in blend map generation, there can be a difference in noise levels in the images 534 and 538, such as when the blended long image typically has lower noise than the blended short image. Thus, it may be desirable to minimize the mixing between the two images 534 and 538. Also, a blending operation may consider the motion map 606 and the saturation map 608, so the blend map 612 can be based on both maps 606 and 608. Details of an example implementation of the blend map generation operation 610 can be found below in relation to FIG. 9.

A multi-frame (MF) depth map generation operation 614 receives the blend map 612, the short depth map 536, and the long depth map 540. The MF depth map generation operation 614 operates to generate a multi-frame depth map 616 based on the blend map 612, the short depth map 536 and the long depth map 540. For example, the depth map 616 may represent a combination of the short depth map 536 and the long depth map 540, where the combination is based on or controlled by the blend map 612. Details of an example implementation of the depth map generation operation 614 can be found below in relation to FIG. 10.

Although FIG. 6 illustrates one example of an approach 600 for multi-frame depth fusion for relighting of images, various changes may be made to FIG. 6. For example, the approach 600 may involve the use of more than two input images and more than two depth maps.

FIGS. 7A, 7B, 7C, and 7D illustrate an example approach 700 for motion map generation for relighting of images in accordance with this disclosure. In some embodiments, the approach 700 shown here is used by the deghosting operation 602 to generate a motion map 606. For ease of explanation, the approach 700 illustrated in FIG. 7 may be described as being used by the electronic device 101 of FIG. 1. However, the approach 700 may be used with any suitable electronic device and in any suitable system. Also, in the discussion of FIGS. 7A-7D, the YUV color system is used, where "Y" represents luminance information (brightness) and "U" and "V" represent chrominance information (color). However, any other suitable imaging data may be processed here.

Figure 7A:
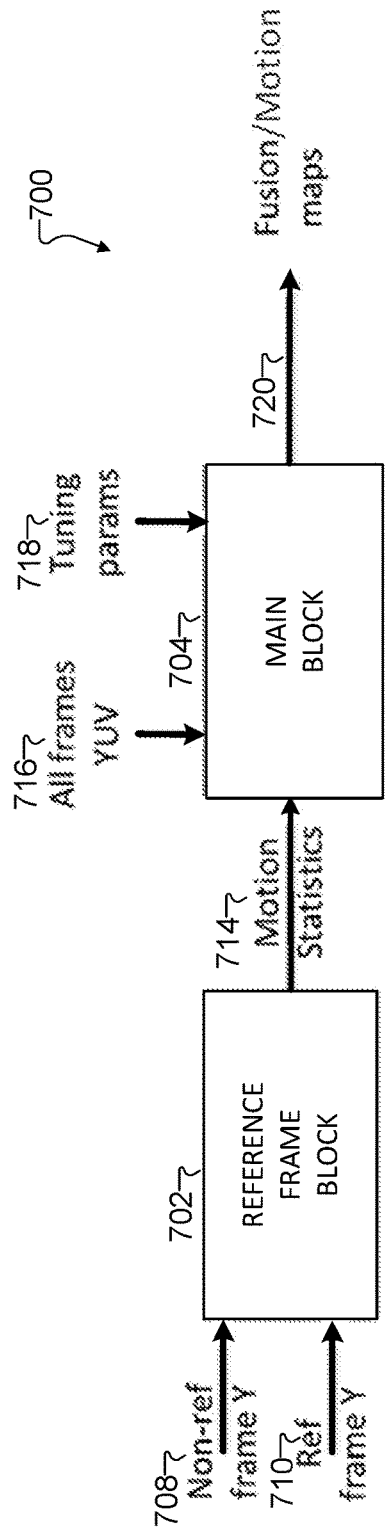
FIGS. 7A, 7B, 7C, and 7D illustrate an example approach for motion map generation for relighting of images in accordance with this disclosure.
Figure 7B:
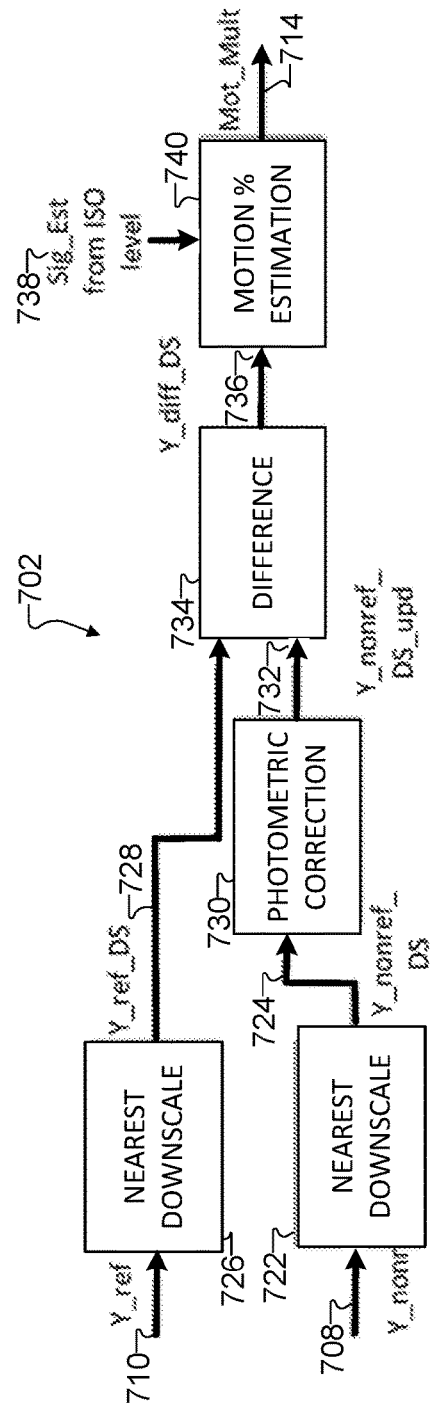

As shown in FIG. 7A, the approach 700 for motion map generation here includes a reference frame block operation 702 and a main block operation 704. The inputs to the reference frame block operation 702 include a Y non-reference frame 708 (meaning luminance data for a non-reference image frame) and a Y reference frame 710 (meaning luminance data for a reference image frame). The reference frame block operation 702 generates motion statistics 714 from these inputs. One example implementation of the reference frame block operation 702 is shown in FIG. 7B. The inputs to the main block operation 704 include the motion statistics 714, YUV frames 716, and tuning parameters 718. The YUV frames 716 represent full image data for the reference and non-reference image frames, and the tuning parameters 718 represents parameters that can be set as needed or desired in any particular implementation. The main block operation 704 generates fusion/motion maps 720 using these inputs, where the fusion/motion maps 720 may represent the motion map 606. One example implementation of the main block operation 704 is shown in FIG. 7C.

As shown in FIG. 7B, the reference frame block operation 702 includes a downscale operation 722, a downscale operation 726, a photometric correction operation 730, a difference operation 734, and a motion percentage estimation operation 740. The downscale operation 722 produces a Y non-reference downscaled frame 724, which represents a downscaled version of the Y non-reference frame 708. The downscale operation 726 produces a Y reference downscaled frame 728, which represents a downscaled version of the Y reference frame 710. The downscale operations 722 and 726 may use any suitable technique for downscaling image data, such as a nearest neighbor approach.

The photometric correction operation 730 produces a Y non-reference downscaled corrected frame 732, which represents a corrected version of the Y non-reference downscaled frame 724. For example, the photometric correction operation 730 can adjust the overall brightness level of the Y non-reference downscaled frame 724 to more closely match the overall brightness level of the Y reference downscaled frame 728. The difference operation 734 produce a Y difference down-scaled frame 736, which represents the differences in luminance data between the Y reference downscaled frame 728 and the Y non-reference downscaled corrected frame 732. The motion percentage estimation operation 740 generates the motion statistics 714 based on the Y difference down-scaled frame 736 and a significance estimate 738 (which is based on an ISO level).

Figure 7C:
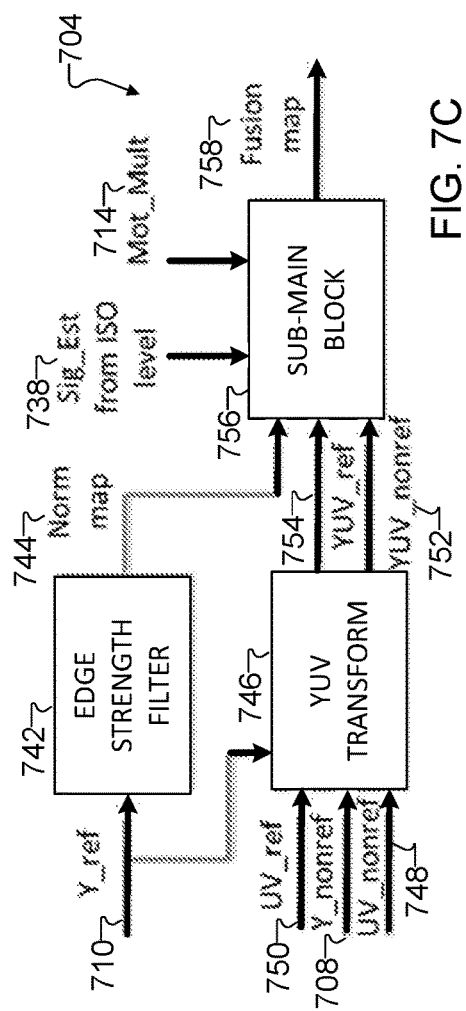

As shown in FIG. 7C, the main block operation 704 includes an edge strength filter 742, a YUV transform operation 746, and a sub-main block operation 756. The edge strength filter 742 operates to identify edges in the Y reference frame 710 and to produce a normal map 744. The YUV transform operation 746 generates a YUV reference frame 754 and a YUV non-reference frame 752 based on the Y reference frame 710, a UV reference frame 750 (which represents the chrominance data of the reference image frame), the Y non-reference frame 708, and a UV non-reference frame 748 (which represents the chrominance data of the non-reference image frame). The sub-main block operation 756 generates a fusion map 758 from the motion statistics 714, the significance estimate 738, the normal map 744, the YUV reference frame 754, and the YUV non-reference frame 752. One example implementation of the sub-main block operation 756 is shown in FIG. 7D.

Figure 7D:
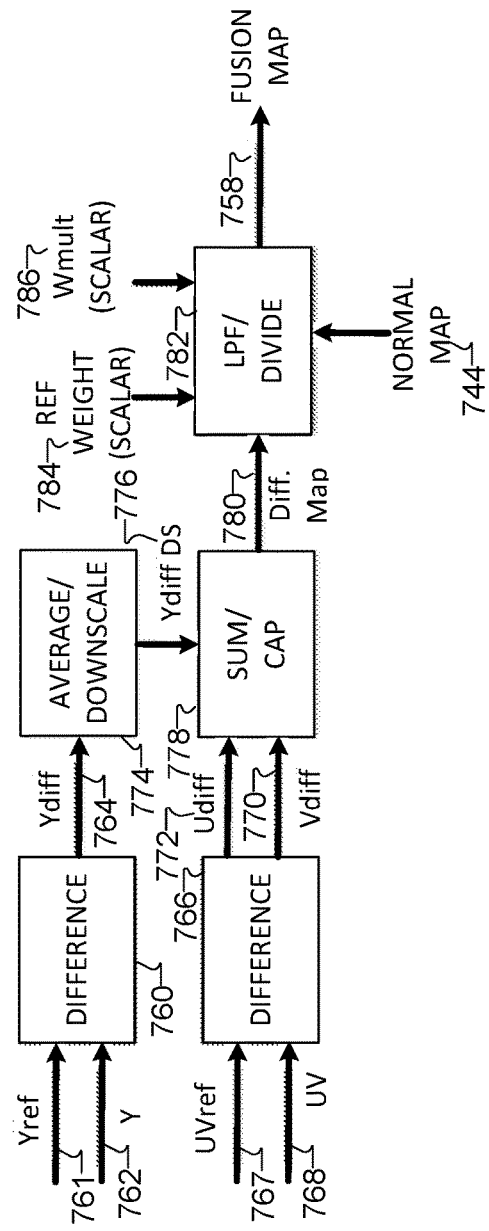

As shown in FIG. 7D, the sub-main block operation 756 includes a difference operation 760, a difference operation 766, an average/downscale operation 774, a sum/cap operation 778, and a low pass filter (LPF)/divide operation 782. The difference operation 760 generates a Y difference frame 764 by comparing each Y reference value 761 from the Y reference frame 710 and a corresponding Y value 762 from the Y non-reference frame 708. The difference operation 766 generates a U difference frame 772 by comparing each U reference value 767 from the UV reference frame 750 and a corresponding U value 768 from the UV non-reference frame 748. The difference operation 766 also generates a V difference frame 770 by comparing each V reference value 767 from the UV reference frame 750 and a corresponding V value 768 from the UV non-reference frame 748.

The average/downscale operation 774 generates a Y difference downscale frame 776 the Y difference frame 764, such as by averaging values in the Y difference frame 764 or otherwise downscaling the Y difference frame 764. The sum/cap operation 778 generates a difference map 780 from the Y difference downscale frame 766, the U difference frame 772, and the V difference frame 770. The LPF/divide operation 782 generates a fusion map 758 using a scalar reference weight 784, a scalar multi-frame weight 786, the difference map 780, and the normal map 744. The scalar reference weight 784 and the scalar multi-frame weight 786 can be included in the tuning parameters 718.

Note that additional details regarding one example implementation of the deghosting operation can be found in U.S. patent application Ser. No. 16/278,543 filed on Feb. 18, 2019 (which is hereby incorporated by reference in its entirety). However, any other suitable implementation may be used for the deghosting operation 602.

Although FIGS. 7A, 7B, 7C, and 7D illustrate one example of an approach 700 for motion map generation for relighting of images, various changes may be made to FIGS. 7A, 7B, 7C, and 7D. For example, more than two image frames may be subjected to deghosting at the same time. Also, a motion map may be generated in any other suitable manner.

Figure 8:
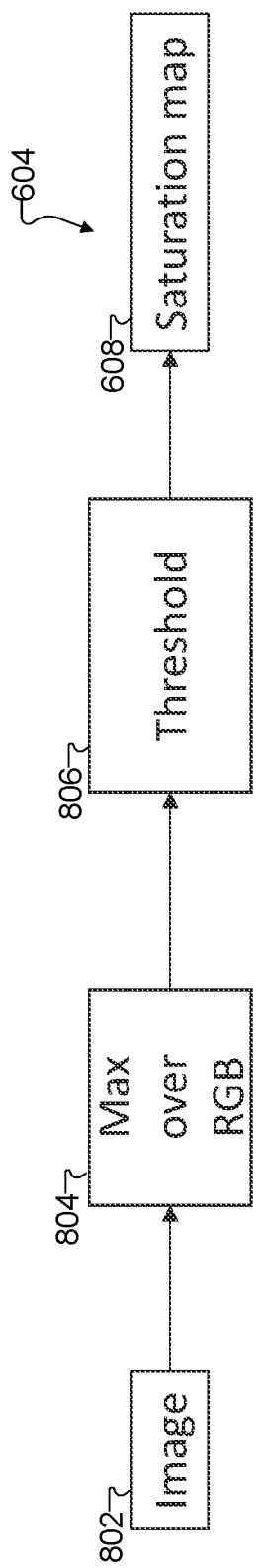
FIG. 8 illustrates an example approach for exposure analysis in accordance with this disclosure.

FIG. 8 illustrates an example approach for exposure analysis 604 in accordance with this disclosure. For ease of explanation, the exposure analysis 604 illustrated in FIG. 8 may be described as being used by the electronic device 101 of FIG. 1. However, the exposure analysis 604 may be used with any suitable electronic device and in any suitable system. The exposure analysis 604 shown in FIG. 8 details the exposure analysis 604 shown in FIG. 6, namely by receiving and processing the short single view 534 and the long single view 538 and outputting the saturation map 608.

As shown in FIG. 8, one or more input images 802 (which may represent the short single view 534 and the long single view 538) are received. Each pixel in the one or more input images 802 is processed using a "max over RGB" function 804 to determine the maximum saturation between the R, G, and B values of that pixel. In other words, differences are calculated between the R value and the G value, the R value and the B value, and the G value and the B value for each pixel, and the greatest difference among the calculated differences is used as the saturation value for that pixel. The saturation level for each pixel is compared to a threshold by a thresholding function 806 in order to determine an accurate saturation. In some cases, the threshold can be determined based on a maximum saturation level or a maximum change from an adjacent pixel. Outputs from the thresholding function 806 form a saturation map 608, which indicates respective saturation levels for the pixels in each input image 802. For instance, the saturation map 608 can have values between zero and one, where a value of one indicates no saturation and a value of zero indicates full saturation. The saturation map 608 here may represent the saturation map 608 in FIG. 6.

Although FIG. 8 illustrates one example of an exposure analysis 604 for exposure analysis, various changes may be made to FIG. 8. For example, a saturation map may be generated in any other suitable manner.

Figure 9:
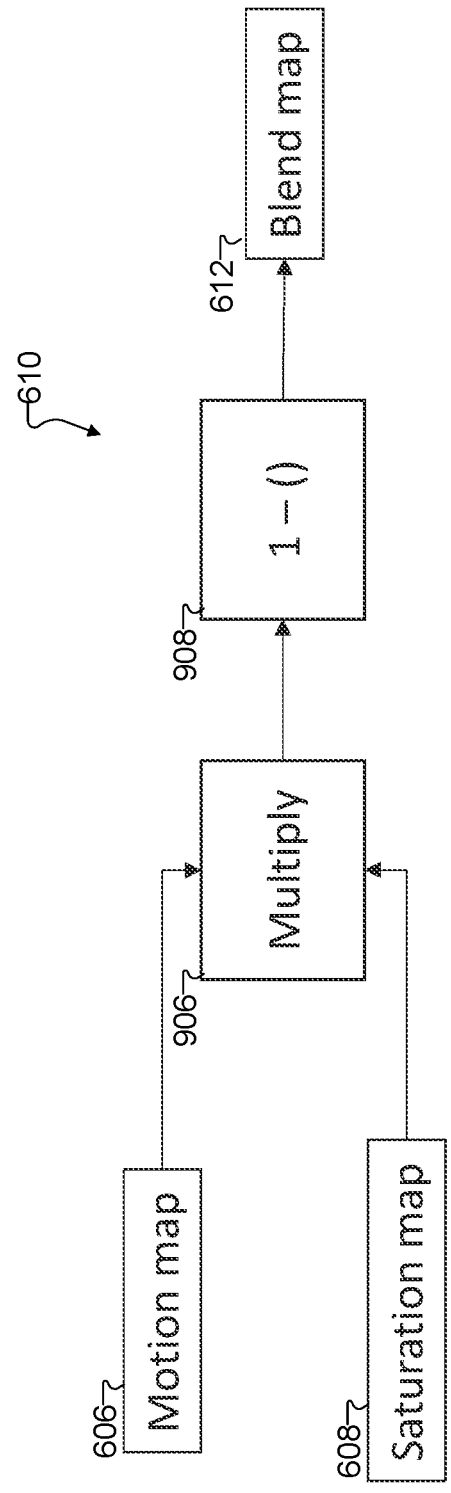
FIG. 9 illustrates an example approach for blend map generation in accordance with this disclosure.

FIG. 9 illustrates an example approach for blend map generation 610 in accordance with this disclosure. For ease of explanation, the blend map generation 610 illustrated in FIG. 9 may be described as being used by the electronic device 101 of FIG. 1. However, the blend map generation 610 may be used with any suitable electronic device and in any suitable system. The blend map generation 610 shown in FIG. 9 details the blend map generation 610 shown in FIG. 6, namely by receiving and processing the motion map 606 and the saturation map 608 and outputs the blend map 612.

As shown in FIG. 9, the approach for blend map generation 610 here receives a motion map 606 (which may also represent the motion map 720) and a saturation map 608. In some embodiments, both the motion map 606 and the saturation map 608 have values between zero and one. A multiplier operation 906 generates values by multiplying corresponding values for each pixel from the motion map 606 and the saturation map 608. An inverse operation 908 calculates an inversion of the values generated by the multiplier operation 906, which in this example involves subtracting each value generated by the multiplier operation 906 from a value of one. The resulting values form a blend map 612. Here, the values in the blend map 612 may include a first value (such as a value of one) to indicate where a pixel value from a long depth map should be used and a second value (such as a value of zero) to indicate where a pixel value from the short depth map should be used.

Although FIG. 9 illustrates one example of an approach for blend map generation 610, various changes may be made to FIG. 9. For example, a blend map may be generated in any other suitable manner.

Figure 10:
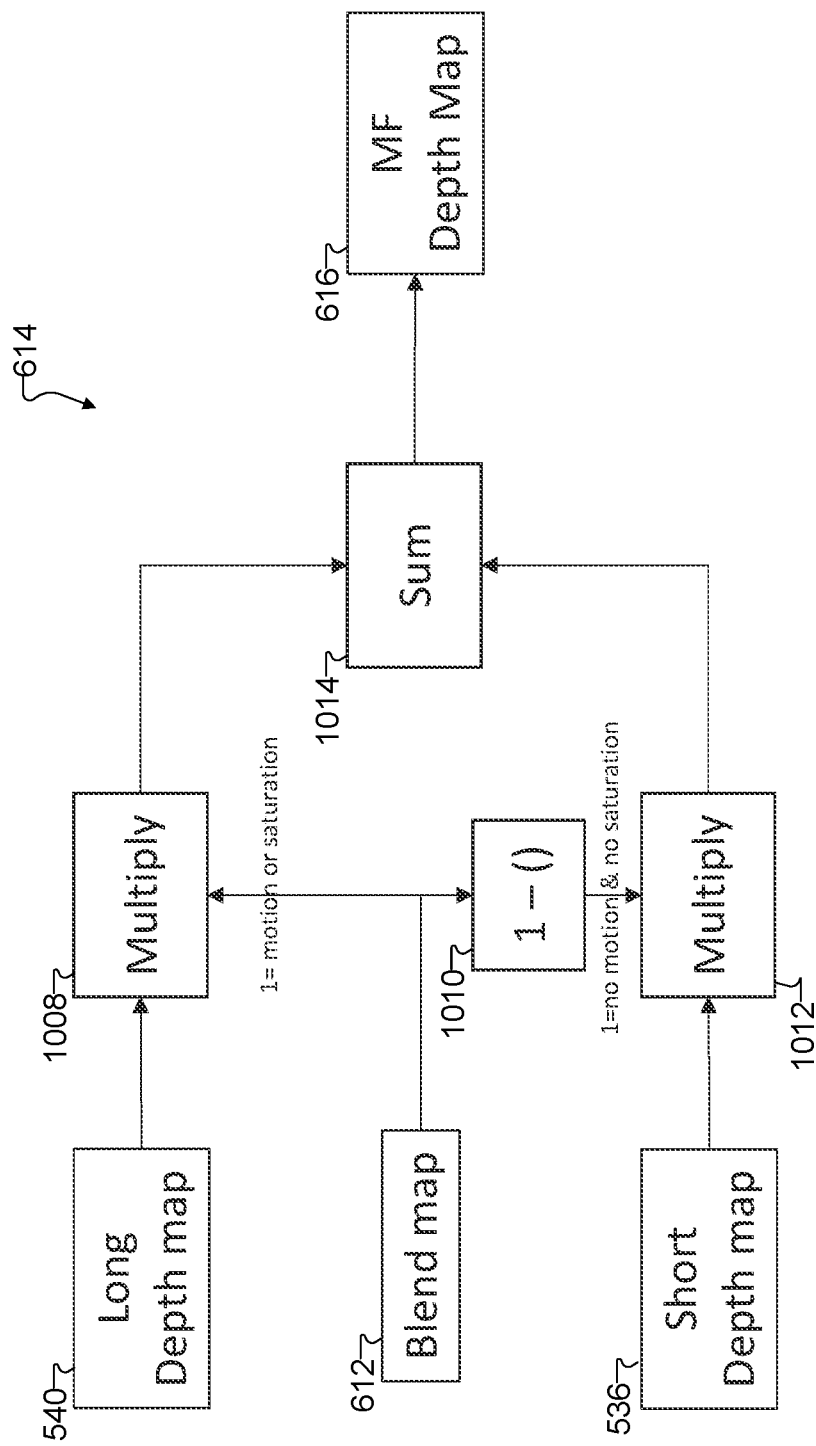
FIG. 10 illustrates an example approach for multi-frame depth map generation in accordance with this disclosure.

FIG. 10 illustrates an example multi-frame depth map generation 614 for multi-frame depth map generation in accordance with this disclosure. For ease of explanation, the multi-frame depth map generation 614 illustrated in FIG. 10 may be described as being used by the electronic device 101 of FIG. 1. However, the multi-frame depth map generation 614 may be used with any suitable electronic device and in any suitable system. The multi-frame depth map generation 614 shown in FIG. 10 details the multi-frame depth map generation 614 shown in FIG. 6, namely by receiving and processing the long depth map 540, the short depth map 536, and the blend map 612, and outputting the MF depth map 616.

As shown in FIG. 10, the multi-frame depth map generation 614 for multi-frame depth map generation receives a long depth map 540, a blend map 612, and a short depth map 536. In some embodiments, the blend map 612 contains values between zero and one, and each of these values controls whether a pixel from the long depth map 540 or a pixel from the short depth map 536 should be used. A multiplier operation 1008 multiplies the values in the blend map 612 with corresponding values in the long depth map 540. An inverse operation 1010 calculates an inversion of the values in the blend map 612, which in this example involves subtracting each value in the blend map 612 from a value of one. A multiplier operation 1012 multiplies the inverted values from the blend map 612 with corresponding values in the short depth map 536. A sum operation 1014 combines the values output from the multiplier operations 1008 and 1012 to produce values in a multi-frame depth map 616.

Although FIG. 10 illustrates one example of an approach for multi-frame depth map generation 614, various changes may be made to FIG. 10. For example, a multi-frame depth map may be generated in any other suitable manner.

FIGS. 11A, 11B, 11C, and 11D illustrate an example approach 1100 for multi-frame relighting in accordance with this disclosure. For ease of explanation, the approach illustrated in FIGS. 11A, 11B, 11C, and 11D may be described as being used by the electronic device 101 of FIG. 1. However, this approach may be used with any suitable electronic device and in any suitable system. The approach 100 shown in FIG. 11 continues the process shown in FIG. 6 or 10, namely by receiving and processing the short single view 534, the long single view 538, the motion map 606, and the MF depth map 616.

Figure 11A:
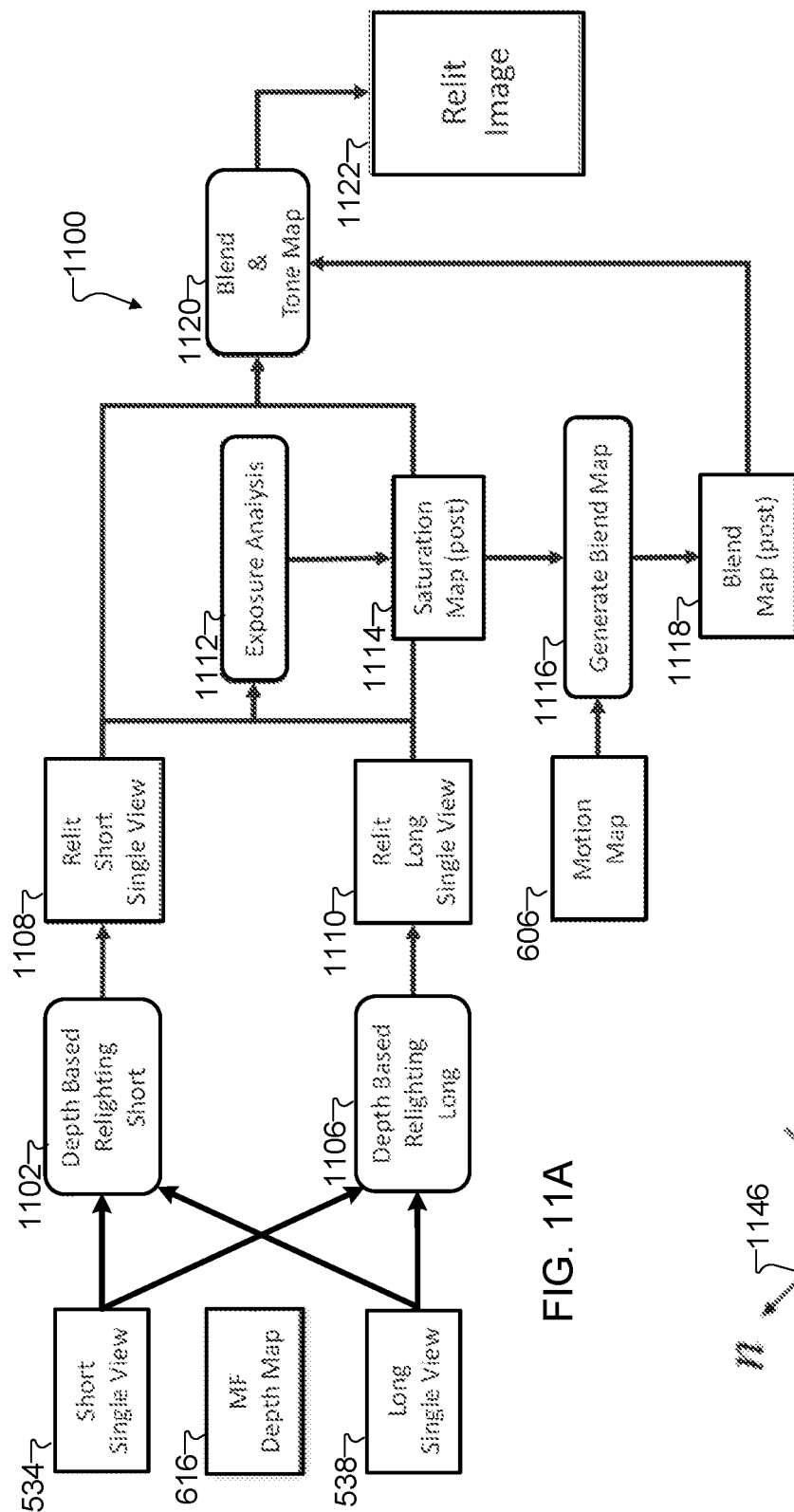
FIGS. 11A, 11B, 11C, and 11D illustrate an example approach for multi-frame relighting in accordance with this disclosure.

As shown in FIG. 11A, the approach 1100 for multi-frame relighting receives a short single view 534, a long single view 538, and a multi-frame depth map 616 (which can be generated as described above). A depth-based relighting operation 1102 applies relighting to the short single view 534 using the multi-frame depth map 616, and a depth-based relighting operation 1106 applies relighting to the long single view 538 using the multi-frame depth map 616. The operations of the depth-based relighting operations 1102, 1106 are discussed in greater detail in relation to FIG. 11B. The depth-based relighting operation 1104 generates a relit short single view 1108, and the long depth-based relighting operation 1106 generates a relit long single view 1110.

An exposure analysis 1112 generates a saturation map 1114 from the relit short single view 1108 and the relit long single view 1110. This can occur in the same or similar manner as discussed above in relation to the exposure analysis 604. A blend map generation operation 1116 generates a blend map 1118 by combining the saturation map 1114 and the motion map 606. This can occur in the same or similar manner as discussed above in relation to the blend map generation operation 610. A blend and tone map operation 1120 generates a final relit image 1122 using the relit short single view 1108, the relit long single view 1110, and the blend map 1118.

Figure 11D:
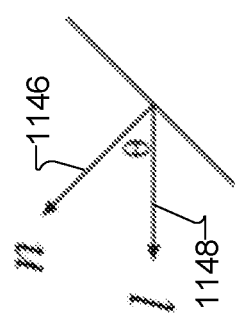
Figure 11B:
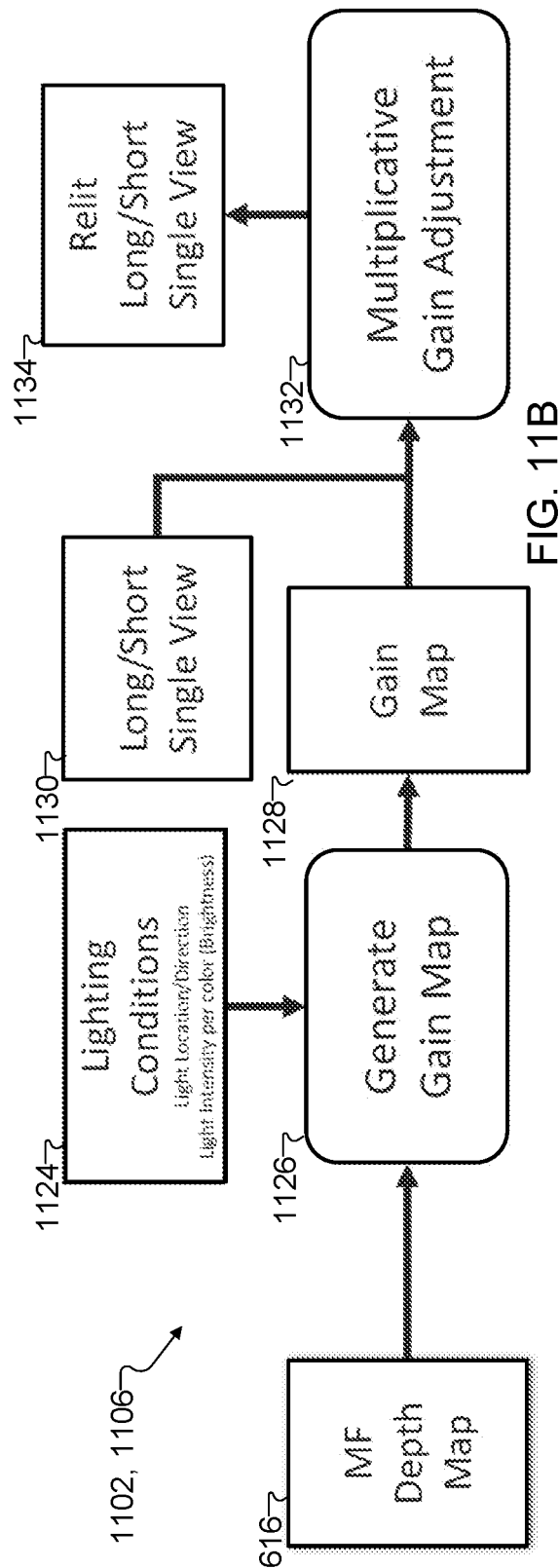

As shown in FIG. 11B, the depth-based relighting operations 1102 and 1106 each includes a gain map generation operation 1126 and a multiplicative gain adjustment operation 1132. The gain map generation operation 1126 generates a gain map 1128 using the depth map 616 and lighting conditions 1124. The lighting conditions 1124 represent one or more simulated light sources to be used during a relighting operation. Gain map generation is described in greater detail below in relation to FIG. 11C. The lighting conditions 1124 are conditions used to alter an image using different lighting effects. The lighting conditions 1124 can include, for example, a location of a simulated light source, a direction of illumination of the simulated light source, and light intensity of the simulated light source per color. The multiplicative gain adjustment operation 1132 generates a relit single view 1134, which corresponds to the relit short single view 1108 for the short depth-based relighting 1104 and the relit long single view 1110 for the long depth-based relighting 1106, from a single view 1130 (which could represent short single view 534 or long single view 538).

Figure 11C:
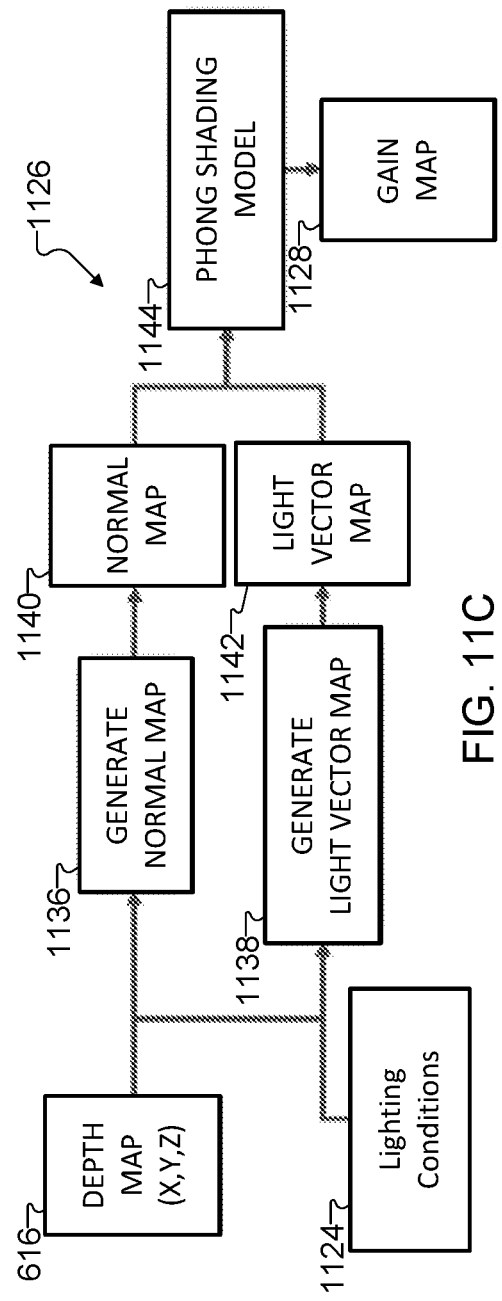

As shown in FIG. 11C, the gain map generation operation 1126 includes a normal map generation operation 1136, a light vector map generation operation 1138, and a shading model operation 1144. The normal map generation operation 1136 generates a normal map 1140 from the depth map 616 and the lighting conditions 1124. In some embodiments, the normal map 1140 includes, for every (x,y) position in an image, the value of a surface unit normal vector 1146 at that location ($n_x$, $n_y$, $n_z$), which is illustrated in FIG. 11D.

The light vector map generation operation 1138 generates a light vector map from the depth map 616 and the lighting conditions 1124. The light source position(s) from the lighting conditions 1124 can be used to determine the light vector. In some embodiments, a unit incident light ray vector 1148 ($l$) can be determined as follows:

$$l(x,y,z)=(x,y,z)-\text{lightSourcePosition} \qquad (1)$$

The shading model operation 1144 generates a gain map 1128 using the normal map 1140 and the light vector map 1142. In some embodiments, a gain factor G for each point in the gain map 1128 can be determine as follows:

$$S=d^{-2}\max(0,\vec{n},\vec{l}) \qquad (2)$$

$$G=\alpha+\beta^{r,g,b}\cdot S \qquad (3)$$

where S represents a shading coefficient, d represents a distance of a simulated light source from a specified point, $\vec{n}$ represents the surface unit normal vector 1146 at that specified point, $\vec{l}$ represents the unit incident light ray vector 1148 at that specified point, α represents a positive coefficient, and β represents a brightness of the simulated light source. The gain factor can be used with the original image to generate a relit image 1122. In some embodiments, the relit image 1122 (I) can be determined as follows:

$$I_{relit}^{r,g,b}=G\cdot I_{orig}^{r,g,b} \qquad (4)$$

Although FIGS. 11A, 11B, 11C, and 11D illustrate one example of an approach 1100 for multi-frame relighting, various changes may be made to FIGS. 11A, 11B, 11C, and 11D. For example, the approach 1100 may involve the use of more than two input images.

FIGS. 12A, 12B, 12C, and 12D illustrate specific example techniques for gain map generation in accordance with this disclosure. This approach may, for example, be used as part of or within the gain map generation operation 1126. For ease of explanation, the example techniques illustrated in FIGS. 12A, 12B, 12C, and 12D may be described as being used by the electronic device 101 of FIG. 1. However, the example techniques may be used with any suitable electronic device and in any suitable system.

As shown in FIG. 12A, a point source relighting effect 1202 is illustrated. Here, the point source relighting effect 1202 relights an original image I=[$I_r$, $I_g$, $I_b$] using a point light source 1214. The point source relighting effect 1202 can also adjust light properties (such as color) based on the light intensity per color channel. In some cases, this can be expressed as β=[$β_r$, $β_g$, $β_b$], where β can be adjusted to add a color relighting effect. The point source relighting effect 1202 here can provide a lighting effect across an image based on the location and color profile of the point light source 1214.

As shown in FIG. 12B, a parallel light source effect 1204 is illustrated. Here, the parallel light source effect 1204 relights the original image I using a simulated parallel light source 1216. The simulated parallel light source 1216 here can be used with constant light properties or variable light properties. For example, the color profile of each of the light sources in the parallel light source 1216 can be different in order to provide variable light effects.

In FIG. 12C, a foreground brightening lighting effect 1206, which is a special case of the parallel light source effect 1204, is shown. For this lighting effect, a reference curve 1218 represents an example curve for a soft ($\gamma$=2) front lighting effect, and a foreground lighting curve 1220 represents a strong ($\gamma$=5) lighting effect. When a simulated light source is applied to the image, the gains used to form the relit image $I_{new}$ can be determined as follows:

$$z = w(x, y) \quad (5)$$

$$S = F(z) \quad (6)$$

$$F(z) = \left(1 - \frac{z}{255}\right)^\gamma \quad (7)$$

$$G = \alpha + \beta \cdot S \quad (8)$$

$$I_{new} = G \cdot I \quad (9)$$

where the position of each pixel is defined by (x, y), z represents the depth at location (x,y), and F(z) represents a monotonically-decreasing polynomial function with increasing depth.

In FIG. 12D, a background brightening lighting effect 1208, which is a special case of the parallel light source effect 1204, is shown. For this lighting effect, a reference curve 1222 represents an example curve for a soft ($\gamma$=2) back lighting effect, and a background lighting curve 1224 represents a strong ($\gamma$=5) lighting effect. When a simulated light source is applied to the image, the gains used to form the relit image $I_{new}$ can be determined as follows:

$$z = w(x, y) \quad (10)$$

$$S = F(z) \quad (11)$$

$$F(z) = 1 - \left(1 - \frac{z}{255}\right)^\gamma \quad (12)$$

$$G = \alpha + \beta \cdot S \quad (13)$$

$$I_{new} = G \cdot I \quad (14)$$

where the position of each pixel is defined by (x, y), z represents the depth at location (x,y), and F(z) represents a monotonically-increasing polynomial function with increasing depth.

Although FIGS. 12A, 12B, 12C, and 12D illustrate specific examples of techniques for gain map generation, various changes may be made to FIGS. 12A, 12B, 12C, and 12D. For example, gain maps can be generated for any other suitable simulated light source(s) and for any other suitable relighting operations.

FIGS. 13A and 13B illustrate example results of relighting operations in accordance with this disclosure. In particular, FIG. 13A illustrates an example image 1302 obtained using a conventional approach, and FIG. 13B illustrates an example image 1304 obtained using the approaches described in this patent document.

As can be seen in FIG. 13A, the image 1302 is a scene that is indoors with two apples placed on a table in the foreground, with a structure in the background that is visible through a window. In image 1302, the foreground of the scene is darker, reducing the amount of details that are visible in the image. The relighting increases the brightness of the foreground in the indoor relit image 1304. The details of the apples are more visible, and the light shining on the table is more clear after the relighting effect has been added.

Although FIGS. 13A and 13B illustrate one example of results of relighting operations, various changes may be made to FIGS. 13A and 13B. For example, images can be captured of numerous scenes under different lighting conditions, and these figures do not limit the scope of this disclosure. These figures are merely meant to illustrate example types of benefits that might be obtainable using the techniques described above.

Figure 14:
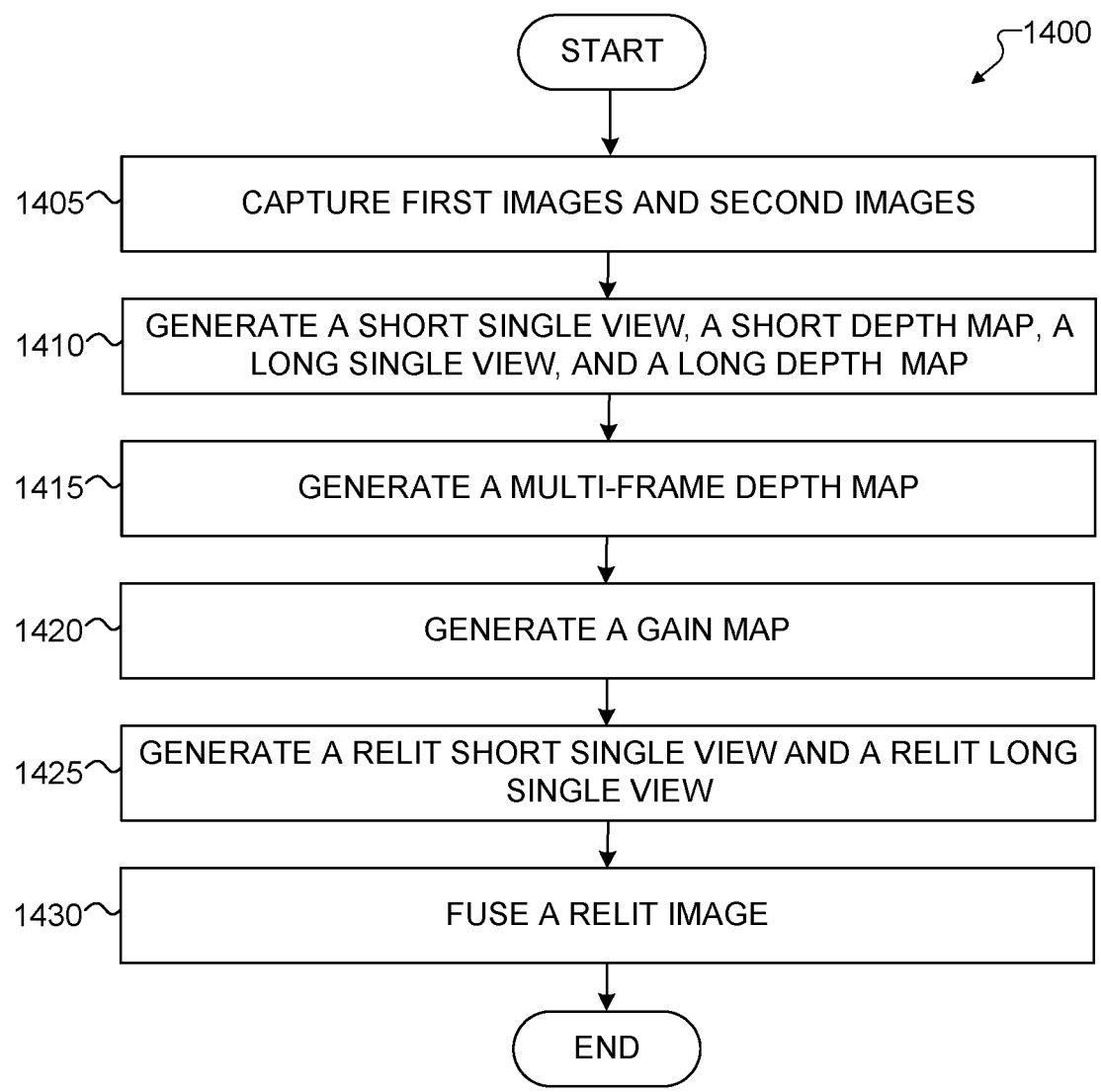
FIG. 14 illustrates an example method for multi-frame depth-based multi-camera relighting of images in accordance with this disclosure.

FIG. 14 illustrates an example method 1400 for multi-frame depth-based multi-camera relighting of images in accordance with this disclosure. For ease of explanation, the method 1400 shown in FIG. 14 is described as being performed using the electronic device 101 shown in FIG. 1. However, the method 1400 shown in FIG. 14 could be used with any other suitable electronic device and in any suitable system.

In operation 1405, the electronic device 101 captures a plurality of first images and a plurality of second images. In some cases, the plurality of first images is captured by a first camera or other image sensor 180, and the plurality of second images is captured by a second camera or other image sensor 180.

In operation 1410, the electronic device 101 generates a short single view, a short depth map, a long single view, and a long depth map. The short single view, the short depth map, the long single view, and the long depth map are generated from the first and second images, such as by using the techniques described above. As a particular example, the first images can be registered with each other, and first images having common exposures can be fused to produce a first short frame and a first long frame. Also, the second images can be registered with each other, and second images having common exposures can be fused to produce a second short frame and a second long frame. Further, a short depth map can be calculated using the first short frame and the second short frame, and another short depth map can be calculated using the first long frame and the second long frame.

In operation 1415, the electronic device 101 generates a multi-frame depth map 616, such as by using the techniques described above. The multi-frame depth map 616 can be generated using the short single view 534, the short depth map 536, the long single view 538, and the long depth map 540. As a particular example, a motion map 606 can be generated, such as by using a deghosting operation 602 on the short single view 534 and the long single view 538. Also, a saturation map 608 can be generated, such as by using an exposure analysis 1112 on the short single view 534 and the long single view 538. Further, a blend map 612 can be generated, such as by combining the motion map 606 and the saturation map 608. The multi-frame depth map 616 can then be generated by applying the blend map 612 to each of the short depth map 536 and the long depth map 540.

In operation 1420, the electronic device 101 generates a gain map 1128, such as by using the techniques described above. The gain map 1128 can be generated using the multi-frame depth map 616 and lighting conditions 1124, which introduce a relighting effect into the gain map 1128. The lighting conditions 1124 can include a point light source 1214 or a parallel light source 1216. The parallel light source 1216 may be applied in front of an image to create a foreground brightening effect 1206 or in back of an image to create a background brightening effect 1208. As a particular example, a normal map 1140 can be generated using the multi-frame depth map 616 and the lighting conditions 1124, where the normal map 1140 contains, for each location in a scene, a value of a surface normal 1146 at that location. Also, a light vector map 1142 can be generated from the multi-frame depth map 616 and the lighting conditions 1124, where the light vector map 1142 indicates, for each location in the scene, a light vector 1148 from a light source to that location. The gain map 1128 can be generated using a shading model 1144 to combine the normal map 1140 and the light vector map 1142.

In operation 1425, the electronic device 101 generates a relit short single view 1108 and a relit long single view 1110, such as by using the techniques described above. For example, the relit short single view 1108 and the relit long single view 1110 can be generated by applying the gain map 1128 to the short single view 534 and the long single view 538.

In operation 1430, the electronic device 101 fuses the relit short single view 1108 and the relit long single view 1110 to form a relit image 1122. For example, the relit image 1122 can be generated by fusing the relit short single view 1108 and the relit long single view 1110 based on an additional blend map 1118. As a particular example, a saturation map 1114 can be generated using an exposure analysis 1112 on the relit short single view 1108 and the relit long single view 1110. Also, the additional blend map 1118 can be generated by combining the saturation map 1114 and the motion map 606. The relit image 1122 can then be generated using a blend and tone map operation 1120 by applying the blend map 1118 to the relit short single view 1108 and the relit long single view 1110. At this point, any final post-processing operations can occur.

Although FIG. 14 illustrates one example of a method 1400 for multi-frame depth-based multi-camera relighting of images, various changes may be made to FIG. 14. For example, while shown as a series of steps, various steps in FIG. 14 may overlap, occur in parallel, occur in a different order, or occur any number of times.

It should be noted that while various operations are described above as being performed using one or more devices, those operations can be implemented in any suitable manner. For example, each of the functions in the electronic device 101 can be implemented or supported using one or more software applications or other software instructions that are executed by at least one processor 110 of the electronic device 101. In other embodiments, at least some of the functions in the electronic device 101 can be implemented or supported using dedicated hardware components. In general, the operations of a device can be performed using any suitable hardware or any suitable combination of hardware and software/firmware instructions.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   capturing a plurality of first images using a first image sensor and a plurality of second images using a second image sensor;
   generating a short single view, a short depth map, a long single view, and a long depth map from the plurality of first images and the plurality of second images;
   generating a multi-frame depth map using the short single view, the short depth map, the long single view, and the long depth map;
   generating a gain map using the multi-frame depth map and lighting conditions, wherein the lighting conditions introduce a relighting effect into the gain map;
   generating a relit short single view and a relit long single view by applying the gain map to the short single view and the long single view; and
   generating a relit image by fusing the relit short single view and the relit long single view.

2. The method of claim 1, further comprising:
   registering the plurality of first images;
   fusing images of the plurality of first images having common exposure values into a first short frame and a first long frame;
   registering the plurality of second images;
   fusing images of the plurality of second images having common exposure values into a second short frame and a second long frame;
   producing the short single view from the first short frame and the second short frame and producing the long single view from the first long frame and the second long frame; and
   calculating the short depth map using the first short frame and the second short frame and calculating the long depth map using the first long frame and the second long frame.

3. The method of claim 1, further comprising:
   generating a motion map using a deghosting operation on the short single view and the long single view;
   generating a saturation map using an exposure analysis on the short single view and the long single view;
   generating a blend map by combining the motion map and the saturation map; and
   generating the multi-frame depth map by applying the blend map to each of the short depth map and the long depth map.

4. The method of claim 1, further comprising:
   generating a normal map using the multi-frame depth map and the lighting conditions, wherein the normal map, for each location in a scene, contains a value of a surface normal at the location;
   generating a light vector map from the multi-frame depth map and the lighting conditions, wherein the light vector map, for each location in the scene, indicates a light vector from a light source to the location; and
   generating the gain map using a shading model to combine the normal map and the light vector map.

5. The method of claim 1, further comprising:
   generating a saturation map using an exposure analysis on the relit short single view and the relit long single view;
   generating a blend map by combining the saturation map and a motion map; and
   generating the relit image using a blend and tone map operation by applying the blend map to the relit short single view and the relit long single view.

6. The method of claim 1, wherein:
the lighting conditions include a point source relighting, and
the relit image has light properties applied from a single light source.

7. The method of claim 1, wherein:
the lighting conditions include a parallel light source effect, and the relit image has light properties applied from a plurality of parallel light sources.

8. The method of claim 7, wherein the parallel light source effect is applied to create a foreground brightening effect.

9. The method of claim 7, wherein the parallel light source effect is applied to create a background brightening effect.

10. An electronic device comprising:
a first image sensor configured to capture a plurality of first images;
a second image sensor configured to capture a plurality of second images; and
at least one processing device operatively coupled to the first image sensor and the second image sensor, the at least one processing device configured to:
generate a short single view, a short depth map, a long single view, and a long depth map from the plurality of first images and the plurality of second images;
generate a multi-frame depth map using the short single view, the short depth map, the long single view, and the long depth map;
generate a gain map using the multi-frame depth map and lighting conditions, wherein the lighting conditions introduce a relighting effect into the gain map;
apply the gain map to the short single view and the long single view in order to generate a relit short single view and a relit long single view; and
fuse the relit short single view and the relit long single view in order to generate a relit image.

11. The electronic device of claim 10, wherein the at least one processing device is further configured to:
register the plurality of first images;
fuse images of the plurality of first images having common exposure values into a first short frame and a first long frame;
register the plurality of second images;
fuse images of the plurality of second images having common exposure values into a second short frame and a second long frame;
produce the short single view from the first short frame and the second short frame and produce the long single view from the first long frame and the second long frame; and
calculate the short depth map using the first short frame and the second short frame and calculate the long depth map using the first long frame and the second long frame.

12. The electronic device of claim 10, wherein the at least one processing device is further configured to:
generate a motion map using a deghosting operation on the short single view and the long single view;
generate a saturation map using an exposure analysis on the short single view and the long single view;
combine the motion map and the saturation map in order to generate a blend map; and
apply the blend map to each of the short depth map and the long depth map in order to generate the multi-frame depth map.

13. The electronic device of claim 10, wherein the at least one processing device is further configured to:
generate a normal map using the multi-frame depth map and the lighting conditions, wherein the normal map, for each location in a scene, contains a value of a surface normal at the location;
generate a light vector map from the multi-frame depth map and the lighting conditions, wherein the light vector map, for each location in the scene, indicates a light vector from a light source to the location; and
generate the gain map using a shading model to combine the normal map and the light vector map.

14. The electronic device of claim 10, wherein the at least one processing device is further configured to:
generate a saturation map using an exposure analysis on the relit short single view and the relit long single view;
combine the saturation map and a motion map in order to generate a blend map; and
apply the blend map to the relit short single view and the relit long single view using a blend and tone map operation in order to generate the relit image.

15. The electronic device of claim 10, wherein:
the lighting conditions include a point source relighting, and
the relit image has light properties applied from a single light source.

16. The electronic device of claim 10, wherein:
the lighting conditions include a parallel light source effect, and
the relit image has light properties applied from a plurality of parallel light sources.

17. The electronic device of claim 16, wherein the at least one processing device is configured to apply the parallel light source effect to create a foreground brightening effect.

18. The electronic device of claim 16, wherein the at least one processing device is configured to apply the parallel light source effect to create a background brightening effect.

19. A non-transitory machine-readable medium containing instructions that when executed cause at least one processor of an electronic device to:
capture a plurality of first images using a first image sensor and a plurality of second images using a second image sensor;
generate a short single view, a short depth map, a long single view, and a long depth map from the plurality of first images and the plurality of second images;
generate a multi-frame depth map using the short single view, the short depth map, the long single view, and the long depth map;
generate a gain map using the multi-frame depth map and lighting conditions, wherein the lighting conditions introduce a relighting effect into the gain map;
apply the gain map to the short single view and the long single view in order to generate a relit short single view and a relit long single view; and
fuse the relit short single view and the relit long single view in order to generate a relit image.

20. The machine-readable medium of claim 19, further containing instructions that when executed further cause the at least one processor to:
generate a normal map using the multi-frame depth map and the lighting conditions, wherein the normal map, for each location in a scene, contains a value of a surface normal at the location;

generate a light vector map from the multi-frame depth map and the lighting conditions, wherein the light vector map, for each location in the scene, indicates a light vector from a light source to the location; and
generate the gain map using a shading model to combine the normal map and the light vector map.

\* \* \* \* \*